US006237947B1

United States Patent
Kausch

(10) Patent No.: US 6,237,947 B1
(45) Date of Patent: May 29, 2001

(54) DEVICE AND METHOD FOR AVOIDING HEARING DAMAGE DURING ACTIVATION OF VEHICLE OCCUPANT RESTRAINT SYSTEMS

(75) Inventor: Armin Kausch, Aalen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/297,947
(22) PCT Filed: Nov. 11, 1997
(86) PCT No.: PCT/EP97/06281

§ 371 Date: Jun. 18, 1999

§ 102(e) Date: Jun. 18, 1999

(87) PCT Pub. No.: WO98/21072

PCT Pub. Date: May 22, 1998

(30) Foreign Application Priority Data

Nov. 11, 1996 (DE) .......................................... 296 19 556 U

(51) Int. Cl.⁷ .................................................. B60R 21/32
(52) U.S. Cl. ............................................ 280/735; 180/271
(58) Field of Search .......................... 280/735; 180/271, 180/274, 282

(56) References Cited

U.S. PATENT DOCUMENTS 3,271,520   9/1966   Fletcher et al. .
3,527,472 * 9/1970   Chute et al. ........................... 181/267
3,694,003 * 9/1972   Radke ................................... 180/274
3,844,580   10/1974  Scherenberg .
4,958,372   9/1990   Carter .

FOREIGN PATENT DOCUMENTS 04232142   8/1992   (JP) .
2024250    12/1994  (RU) .

* cited by examiner

Primary Examiner—Paul N. Dickson
Assistant Examiner—Faye M. Fleming
(74) Attorney, Agent, or Firm—Tarolli, Sundheim, Covell, Tummino & Szabo L.L.P.

(57) ABSTRACT

A device and a method for preventing damage to hearing which may result from activation of vehicle occupant restraint systems operate using a source of sound for producing a primary sound event having a sound pressure level non-injurious to hearing. The sound pressure level is, however, sufficient to trigger the so-called acoustic reflex of the human ear which has the effect that the ear's sensitivity is reduced when exposed to high sound pressure levels and the subsequent sound event has only a fraction of the negative effects of the primary sound event on the internal ear. The primary sound event needs only be triggered sufficiently shortly in time before the secondary sound event which occurs on activation of the restraint system and features a sound pressure level injurious to hearing.

40 Claims, 4 Drawing Sheets

Fig. 1
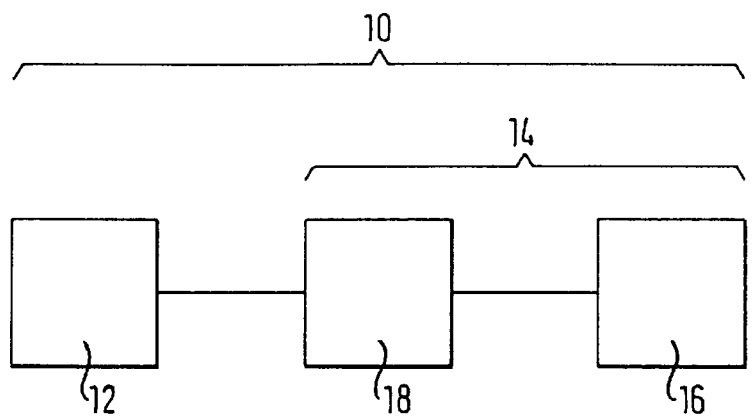
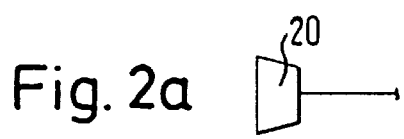
Fig. 2a
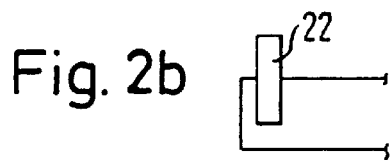
Fig. 2b
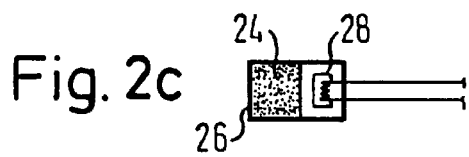
Fig. 2c
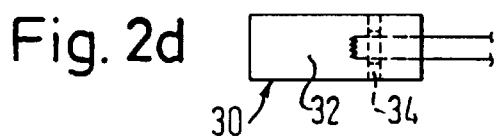
Fig. 2d
Fig. 3a    Fig. 3b    Fig. 3c
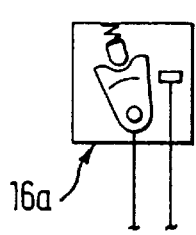 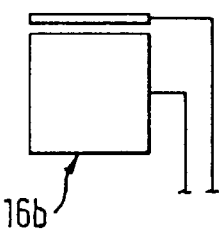 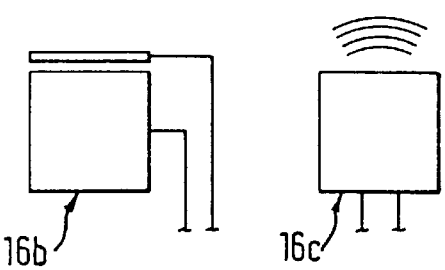

DEVICE AND METHOD FOR AVOIDING HEARING DAMAGE DURING ACTIVATION OF VEHICLE OCCUPANT RESTRAINT SYSTEMS

The invention relates to a device and a method for preventing damage to hearing which may result from activation of vehicle occupant restraint systems.

In vehicle occupant restraint systems, for example, gas bag restraint systems or belt tensioners, gas generators in the form of pyrotechnic gas generators, hybrid gas generators or compressed gas storages are provided which when activated result in a sound event in the form of a loud bang due to the sudden release of energy. In the case of gas bag restraint systems the deployment of the gas bag, in addition, is associated with a strong noise development. The sound pressure levels involved may be so high that damage to hearing of the vehicle occupants may result. Since the protective effect of a restraint system depends, among other things, on the short time needed to inflate a gas bag or on fast tensioning of the belt the risk of damage to hearing has hitherto had to be put up with.

Such a damage to hearing may be a blast trauma, also called an auditory trauma, or an explosion or detonation trauma, one or both of which may be involved in activation of the restraint system, more particularly, of a gas bag restraint system. However, it is not always the case that damage to hearing is involved on activation of a restraint system, instead damage to hearing is more often something seldom. The occurrence of damage to hearing depends on a wealth of factors, e.g. on the nature of the gas generator, the gas bag, passenger space volume of the passenger compartment in the vehicle and on the constitution, more particularly, the age of the vehicle occupant concerned. This is why there are no exact sound level limits for defining damage to hearing. Researching critical sound level limits, as of which damage to hearing occurs, is very difficult since the sound pressure level greatly depends on the kind of measuring instrument employed. In general, however, it can be said that the sound pressure level as of which damage to hearing is involved must be all the more higher the shorter the duration of the sound pulse affecting the ear. As a rule a blast trauma occurs in the case of sound pulses of up to 2 ms duration and peak sound pressure levels exceeding roughly 150 dB. A blast trauma results in inner ear injury, more particularly to injury of the cochlea due to a high-frequency sound event. The symptoms of a blast trauma extend from a short stabbing ear pain or a so-called tinnitus (persistent whistling noise in the upper frequency range) to a so-called tone drop, i.e. a loss of hearing in certain frequency ranges, this last symptom also being termed threshold shift which may be of a temporary nature (TTS-Temporary Threshold Shift) or permanent (PTS-Permanent Threshold Shift).

Unlike a blast trauma an explosion trauma is caused by a sound event having a peak sound pressure level lasting more than 2 ms and in the case of a sound pressure level of more than approx. 150 dB. An explosion trauma is frequently associated with a tear in the ear drum and occasionally with a luxation of the tympanic bone, whereby a loss of hearing over the complete frequency range may be involved. Accordingly, an explosion trauma is an injury of the inner ear and the middle ear. An explosion trauma is caused by sound waves at a low frequency.

On activation of a gas bag restraint system a sound event lasting approx. 50 ms is caused, the sound event not being in a narrow frequency range, it instead taking up a sound spectrum. The sound pressure levels occurring as a maximum extend from approx. 120 to 165 dB. The sound event on activation of a gas bag restraint system begins directly on opening of the compressed gas storage, as a rule on initiation of a pyrotechnic ignition charge. The high-speed emission of the gas from the gas generator as well as the deployment of the gas bag itself produce sound waves having a high sound pressure level, the peak sound pressure levels occurring mostly on commencement of the sound event. The frequencies of below 300 Hz are, according to the current state of research, responsible for ear drum injury and the frequencies above 300 Hz for inner ear injury.

The invention defines a device and a method for preventing damage to hearing, more particularly inner ear injuries, caused by activation of vehicle occupant restraint systems.

The device in accordance with the invention comprises a source of sound for producing a primary sound event having a sound pressure level non-injurious to hearing, which, however, is sufficient to trigger an acoustic reflex of the human ear, and a activation control for the source of sound. The activation control triggers the source of sound in a restraint action so that it produces the primary sound event in time shortly before the occurrence of a secondary sound event which occurs on activation of the restraint system and features a sound pressure level injurious to hearing. The time interval between the sound events, on the one hand, and the sound level of the primary sound event, on the other, are dimensioned so that a damage to hearing as a result of the secondary sound event is prevented.

The method in accordance with the invention provides for production of a primary sound event having a sound pressure level non-injurious to hearing, which, however, is sufficient to trigger an acoustic reflex of the human ear. Also, the primary sound event is produced so shortly before the occurrence of the secondary sound event which occurs on activation of the restraint system and features a sound pressure level injurious to hearing that the acoustic reflex is triggered and damage to hearing as a result of the secondary sound event is thereby prevented.

The device and the method in accordance with the invention make use of the acoustic reflex of the human ear forming a protective reflex which instantly reduces its sensitivity when exposed to high sound pressure levels so that subsequent sound events having the same or higher sound pressure level have only a fraction of the negative effects of the primary sound event on the internal ear. As a result of this the secondary sound event has a lesser physiological effect so that no damage to the inner ear materializes, such as, for example, blast trauma.

The acoustic reflex (stapedius reflex) results from contraction of a muscle in the region of the inner ear, as a result of which the tympanic bone stiffens and the sound pressure level is reduced by approx. 5 dB. The stapedius reflex is caused as of a sound pressure level of approx. 70 dB, the irritation threshold for triggering the reflex in the case of a continuous noise being higher. Adapted to the noise level usually predominant in a vehicle the source of sound is able to produce a primary sound event with a sound pressure level in the range of approx. 70 to approx. 140 dB to trigger the acoustic reflex.

Due to the device in accordance with the invention it is possible, for example, to incorporate gas generators nearer to the head of the occupant in the vehicle.

Preferably, however, the sound pressure level of the primary sound event should amount to at least approx. 100 dB, preferably more than approx. 110 dB. Since the so-called latency time of the acoustic reflex, i.e. the time between the sound event triggering the reflex up to the change in impedance due to the reflex, becomes less with a primary sound event having a higher sound pressure level, sound events which are relatively just below the limit for damage to hearing are best suitable in triggering the acoustic reflex within the shortest time.

The primary sound event triggering the acoustic reflex commences as of approx. 0.5 up to approx. 30 ms prior to the secondary sound event. The optimum spacing between commencement of the primary sound event and that of the secondary sound event depends on the sound pressure level of the primary sound event as a result of the aforementioned interaction between the altitude of the sound pressure level and the latency time of the acoustic reflex. The latency time of the acoustic reflex extends from approx. 0.5 to more than 150 ms, a time of roughly 30 ms being, however, available at the most, prior to activation of the restraint system, depending on the vehicle concerned, for prompting the primary sound event. This is the reason why preferably the primary sound event commences approx. 5 to approx. 15 ms prior to the secondary sound event. It always needs to be assured that the sound pressure level and the time interval between commencement of the primary sound event and commencement of the secondary sound event are adapted to each other so that the latency time of an occupant having a normal hearing function is shorter than the time interval between the commencement of the two sound events.

The primary sound event is required to have a frequency spectrum in the range of approx. 500 to approx. 8000 Hz, preferably in the range of approx. 2000 to approx. 4000 Hz. It is in the latter range that the human ear is most sensitive, i.e. a sound wave having a relatively low sound pressure level is already sensed. In the preferred embodiment the source of sound produces a sound event having a frequency of approx. 3500 Hz. When the primary sound event is produced by the abrupt release of energy of an energy storage, for example, a pyrotechnic material, sound waves of a complete spectrum are generated so that the frequency range in which the generated sound waves are intended to lie exclusively cannot be limited, whereas when the sound waves are produced by a loudspeaker the sound events can be generated in narrow frequency ranges or at an exact frequency.

The primary sound event lasts preferably approx. 2 ms at the most. Since it exhibits a sound pressure level which is relatively just below the limit for damage to hearing, hearing injuries due to the primary sound event need to be excluded. By providing a relatively short primary sound event the occurrence of an explosion trauma as described above can be excluded with relatively high probability, this explosion trauma occurring more particularly in the case of sound events having a duration of more than 2 ms.

The primary sound event may be a short, once-only event in the form of a noise acoustically detectable by the human ear or it may be the result of several single noises in sequence, of which the primary noise commences prior to the secondary sound event.

In accordance with one embodiment the source of sound comprises an energy storage which is for example a compressed gas storage or contains pyrotechnic material. The abrupt release of the energy results in the primary sound event.

Alternatively, the source of sound may also feature a loudspeaker, for instance a piezoelectric loudspeaker by means of which sound events lasting relatively longer may be produced.

The activation control includes preferably a crash sensor, in response to the signal of which in restraint action the primary sound event is produced, as well as in the case of the preferred embodiment a control unit connected to the crash sensor. In this arrangement the control unit is configured so that it, with a predetermined delay after having received a signal from the crash sensor, outputs a signal to the source of sound for triggering the primary sound event. The crash sensor may be a delay sensor for sensing vehicle deceleration, or a tactile sensor as is used for instance to activate side gas bags and which senses deformation of the vehicle in a crash situation. In addition, the crash sensor and the control unit may be configured so that they can sense a crash which can no longer be avoided, by, for example, a spacing sensor being provided which is able to sense the distance away of objects relative to the vehicle. The control unit then computes, for example, on the basis of the actual vehicle speed whether the object approaching relative to the vehicle can still be avoided. In this way it is possible to set the point in time for activating the primary sound event even prior to commencement of a collision. This may prove necessary in the case of a compact car for instance in which the time delay between first deformation of the vehicle and activation of the restraint system as well as the associated production of the secondary sound event is so small that even in the case of instant activation of the primary sound event at commencement of a vehicle contact in the case of a head-on collision not enough time is available for the human ear to trigger the acoustic reflex completely.

The device in accordance with the invention may be configured as a separate assembly and, where appropriate, retrofitted in existing vehicles with restraint systems. The device comprises a complete activation control of its own, a common delay sensor or even a control unit in common with the vehicle occupant restraint system. When a common control unit is incorporated, control of the timing sequence of the primary sound event and secondary sound event is even simpler and more precise.

Since the space requirement for the device in accordance with the invention is slight, it is also possible to integrate it in a restraint system.

The invention defines further a gas bag restraint system for vehicle occupants including a gas bag, a gas generator and an activation control comprising a delay sensor and a control unit. The device in accordance with the invention as described above for preventing damage to hearing as may result from activation of the vehicle occupant restraint system is in this arrangement integrated in the gas bag restraint system.

In addition, a common activation control for activating the gas generator and triggering the primary sound event is preferably provided.

The gas bag restraint system may be configured modular, the gas bag module then being incorporated as a preassembled unit in a vehicle. In this case the source of sound of the device for preventing damage to hearing comprises an energy storage, the energy of which is abruptly released to provide the primary sound event. At least this energy storage forms together with the module, in which it is integrated, a complete preassembled unit.

In accordance with a further embodiment at least the energy storage of the device is integrated in the gas generator of the gas bag restraint system.

Further features and advantages of the invention will be appreciated from the following description of several preferred embodiments and from the following drawings to which reference is made and in which:

FIG. 1 is a simplified representation of a first embodiment of the device in accordance with the invention in which the device is configured as an assembly separate from the vehicle occupant restraint system and operates in accordance with the method according to the invention;

FIGS. 2a to 2d show various embodiments of the source of sound provided in the device in accordance with the invention;

FIGS. 3a to 3c show various embodiments of the crash sensors provided in the device in accordance with the invention;

Figure 4:
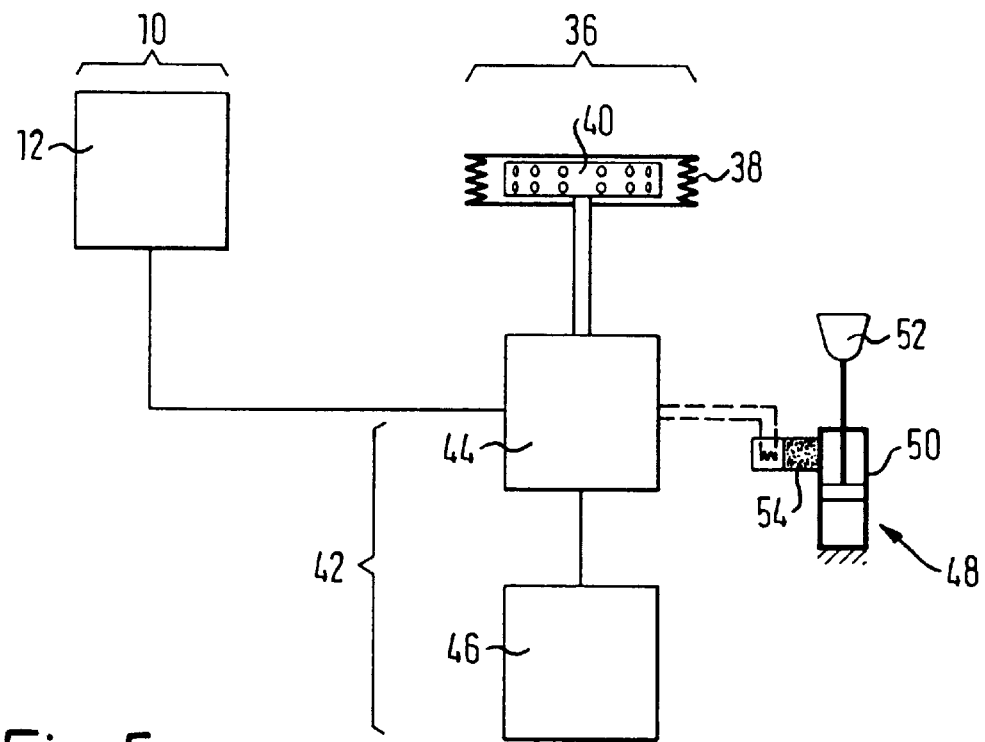
FIG. 4 shows a second embodiment of the device in accordance with the invention in which it is coupled to a vehicle occupant restraint system in the form of a gas bag restraint system or a belt tensioner system.

In FIG. 1 a device 10 for preventing damage to hearing is represented greatly simplified which may be caused by activation of a vehicle occupant restraint system (not shown), for example, a gas bag restraint system or a belt tensioner system. The device 10 comprises a source of sound 12 and an activation control 14 for the source of sound 12. The activation control 14 in turn features a crash sensor 16 and, connected thereto, a control unit 18 to which the source of sound 12 is connected.

The source of sound 12 can be configured differingly as evident from the FIGS. 2a to 2d. It is possible to configure the source of sound 12 as a usual loudspeaker 20 (cf. FIG. 2a) or as a piezoelectric loudspeaker 22 (cf. FIG. 2b). In addition, a sound event to be produced by the source of sound may also be prompted by ignition of pyrotechnic material 24 accommodated in a housing 26 (cf. FIG. 2c). In this arrangement an igniter 28 connected to the control unit 18 protrudes into the housing 26. In the embodiment shown in FIG. 2c the source of sound 12 is configured like a low-power gas generator for vehicle occupant restraint systems. In accordance with FIG. 2d the source of sound 12 is configured as a compressed gas storage 30 having a chamber 32 filled with compressed gas. In a restraint action an opening in a wall 34 of the compressed gas storage is made clear through which the compressed gas emerges, thereby producing a sound event. The sound event may also be produced by, for example, detonation gas contained in the chamber 32 being ignited, which due to the high pressure within the chamber breaks open the wall 34 at predetermined positions, allowing the gas to stream outwardly under high pressure and thereby producing a sound event. As in the case of the embodiment shown in FIG. 2c also the compressed gas storage 30 according to FIG. 2d is configured the same as a gas generator used hitherto as usual in vehicle occupant restraint systems, its capacity merely being very much less. While the sources of sound in accordance with FIGS. 2a and 2b are capable of producing a sound event longer in duration or several sound events in sequence, the sources of sound shown in FIGS. 2c and 2d are merely able to activate a short sound event since they consist of an energy storage the energy of which is released abruptly, thereby generating sound waves.

In the FIGS. 3a to 3c various embodiments of the crash sensor provided in the case of the device in accordance with the invention are depicted. Accordingly, the sensor may be a delay sensor 16a (FIG. 3a), a tactile sensor 16b (FIG. 3b) or a spacing sensor 16c (FIG. 3c). In the case of the delay sensor 16a, for instance, a rotatively mounted part, which in a restraint action swivels from-its basic position, closes an electrical circuit. In the case of the tactile sensor 16b two plates slightly spaced from each other are provided which for instance are provided in mounting the bumpers and which come into contact with each other when slightly deformed so that an electrical circuit is closed. The spacing sensor 16c according to FIG. 3c transmits at regular intervals pulses which are reflected from an object, for example, an object approaching relative to the vehicle, and are re-sensed by the sensor. The corresponding signals are evaluated by the control unit 18 to determine the spacing and the speed of the object moving relatively towards the vehicle and to draw conclusions therefrom as to whether a collision is imminent. For this reason the spacing sensor 16c communicates continuously with the control unit 18.

The device 10 shown in FIG. 1 is incorporated in a vehicle fitted out with a vehicle occupant restraint system. Irrespective of whether the vehicle occupant restraint system works with a pyrotechnic gas generator, a hybrid gas generator or a compressed gas storage, on activation of the vehicle occupant restraint system a loud bang occurs, the sound pressure level of which may result in damage to hearing of the vehicle occupants in the region of the internal ear, among other regions. The device 10 shown in FIG. 1 prevents such damage to hearing by making use of the acoustic reflex of the ear, this namely lowering its sensitivity following the action of a sound event having a high sound pressure level so that a subsequent sound event has lesser physiological effects on the ear, more particularly on the inner ear, even if the secondary sound event were to have a higher sound pressure level than the primary sound event.

When the delay sensor 16a as shown in FIG. 3a is used, in a restraint action, as of a predetermined vehicle deceleration value being attained, this delay sensor which may be configured as a mechanical, electromechanical or electrical delay sensor, generates a signal which is passed on to the control unit 18. The latter processes the signal and actuates the source of sound 12 with a predetermined time delay. Depending on how the source of sound 12 is configured, a primary sound event of a more or less long duration is produced, the sound pressure level of which is sufficiently high to trigger the acoustic reflex, without being so high, however, that it could result in damage to hearing. The primary sound event lasts less than 2 ms, attains a sound pressure level of at least approx. 100 dB and lies preferably in the range of 110 to 140 dB. When a loudspeaker 20, 22 is used as the source of sound 12 the frequency of the primary sound event can be predetermined in tight limits. In this case the frequency spectrum of the primary sound event is preferably in the range of approx. 2000 to approx. 4000 Hz, the ear being particularly sensitive to triggering the acoustic reflex at sound events at about 3500 Hz. When using an energy storage, as is depicted in FIGS. 2c and 2d, a sound event is produced which covers a complete sound spectrum. The control unit 18 controls the source of sound 12 at such an early time that the primary sound event occurs shortly before the secondary sound event which is triggered on ignition of the gas generator provided. The minimum offset in time between commencement of the primary sound event and that of the secondary sound event should be in the range of approx. 5 to 15 ms, i.e. sufficiently large to activate the protective effect by the acoustic reflex in the human ear.

The device 10 shown in FIG. 1 is configured as a separate assembly which may also be retrofitted in a vehicle equipped with a restraint system. The timing sequence of the primary sound event and secondary sound event can, however, be better controlled when the device is integrated in a vehicle occupant restraint system or forms a part thereof, as represented in FIGS. 4 to 8.

In the embodiment as shown in FIG. 4 the device 10 is coupled to a gas bag restraint system 36 which comprises a folded gas bag 38 and an gas generator 40 arranged in the interior thereof. Activation of the gas generator 40 is done via an activation control 42 which is formed by a control unit 44 and a delay sensor 46. The activation control 42 represents a control common to the device 10 and the gas bag restraint system 36. In a crash situation the control unit 44, on receiving a corresponding signal from the delay sensor 46, first outputs a signal to the source of sound 12 and, in a brief time delay thereafter, a secondary signal to the gas generator 40 so that the source of sound 12 produces a primary sound event shortly before ignition of the gas generator 40 and the secondary sound event involved therein.

Instead of being coupled to the activation control 42 of a gas bag restraint system 36, the device 10 may also be employed for preventing damage to hearing which may occur on activation of a belt tensioning system 48, as is likewise depicted in FIG. 4. Although damage to hearing due to activation of a belt tensioning system has yet to be reported, this may be due to the fact that hitherto gas generators have not been arranged in the vicinity of the head of the occupant. Belt tensioning systems are conceivable, however, in which it would be an advantage to arrange the gas generator in the vicinity of the head. In this case the sound pressure level could be high enough to result in damage to hearing, also in the inner ear region, so that it is of advantage to provide the device 10. The belt tensioning system 48 comprises, among other things, a piston/cylinder unit 50, the piston being connected to a belt buckle 52. Pyrotechnic propellant material 54 is ignited by the activation control 42 slightly delayed in time after the primary sound event so that also the high sound pressure level on activation of the belt tensioning system 48 cannot lead to damage to hearing.

The arrangement shown in FIG. 4 may, however, also be modified so that the activation control 42 is coupled to both the belt tensioning system 48 and to the gas bag restraint system 36. Since the belt tensioning system 48 is usually activated in time prior to the gas bag restraint system 36 the gas generator of the belt tensioning system 48 may be employed as the source of sound by the pyrotechnic propellant material 54 being ignited in time sufficiently prior to activation of the gas generator 40 of the gas bag restraint system 36. In this case the separate source of sound 12 can be eliminated.

Figure 5:
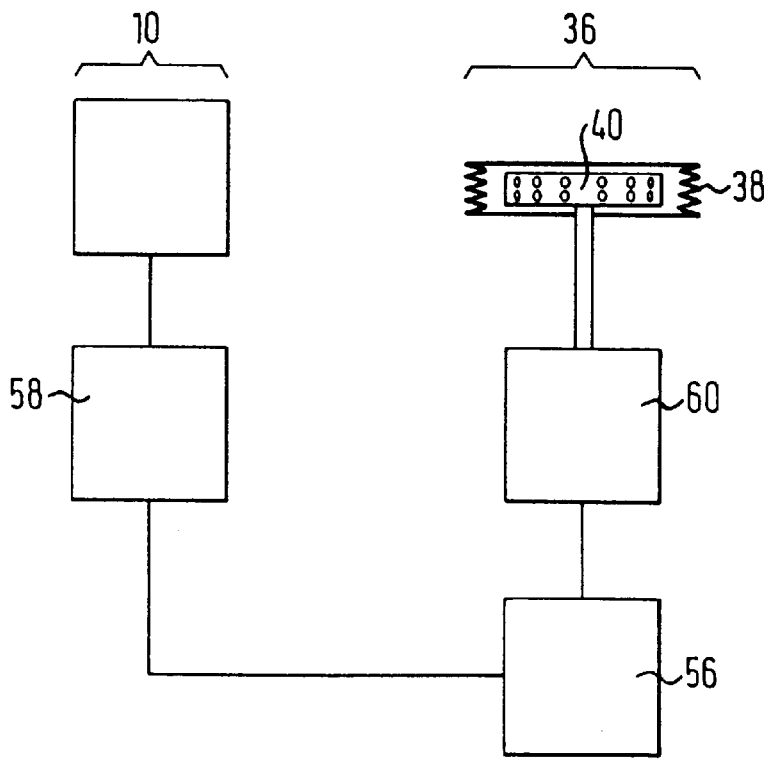
FIG. 5 shows a third embodiment of the device in accordance with the invention in which it is likewise coupled to a gas bag restraint system in accordance with the invention.

The embodiment shown in FIG. 5 differs from that shown in FIG. 4 merely by the device 10 and the gas bag restraint system 36 being coupled to each other by a common delay sensor 56. Instead of a common control unit 44, however, two separate control units 58 and 60 may be provided for the device 10 and the gas bag restraint system 36 respectively.

Figure 6:
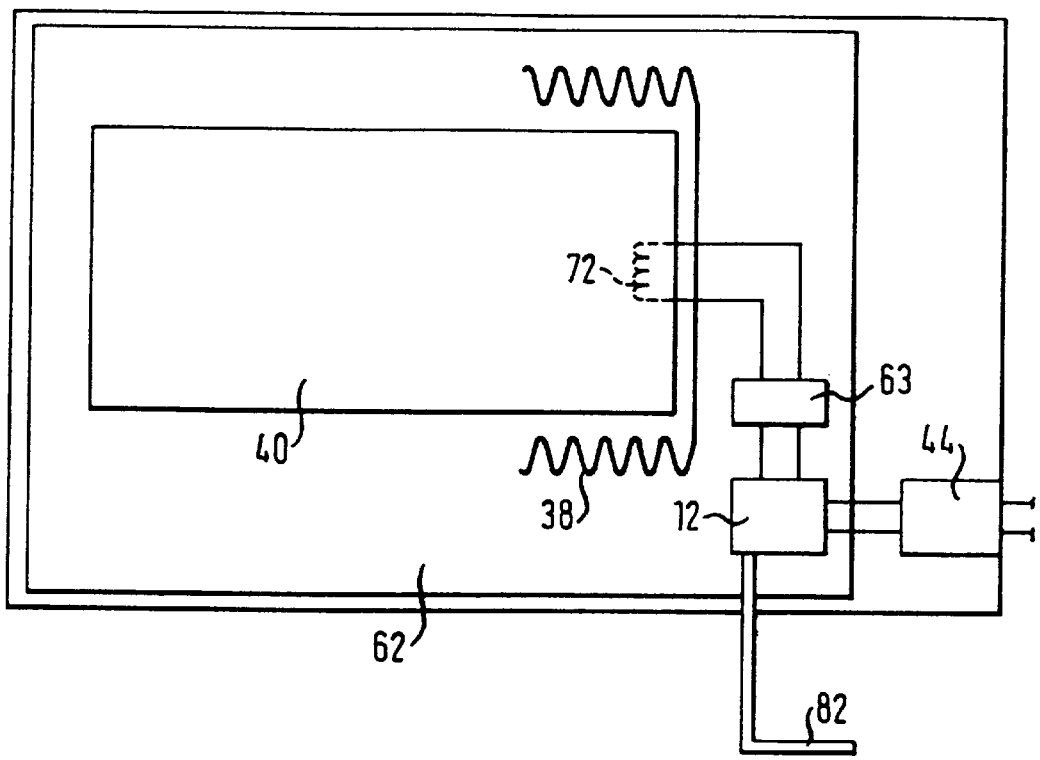
FIG. 6 shows a fourth embodiment of the device in accordance with the invention in which it is integrated in a gas bag module.

Since the device 10 is configured very small it can be integrated in a gas bag module as is evident from FIG. 6. A gas bag module comprises, for instance, a preassembled unit consisting of the gas generator 40 and the gas bag 38, as is evident from FIG. 6. For this purpose the source of sound 12 is secured to a base plate 62 as part of the module to which also the gas generator 40 and the gas bag 38 can be attached and which serves for securing the gas bag module with the source of sound 12 to a steering wheel hub (not shown). Between the source of sound 12 and an igniter 72 protruding into the interior of the gas generator 40 an ignition delay element 63 is arranged. The signal for generating the primary sound event which is directed to the source of sound 12, is routed from the latter to the ignition delay element 63 and from there to the igniter 72 so that the commencement of the primary sound event has a predetermined time interval with regard to the commencement of the secondary sound event. The ignition delay element 63 may be configured as a capacitor, for instance. The arrangement shown in FIG. 6 is very simple in configuration, particularly as regards its circuitry.

In this embodiment too, the primary sound event is produced by ignition of a pyrotechnic material so that the source of sound 12 is configured as a gas generator. The gas generated on ignition of the pyrotechnic material contained in the source of sound 12 can be used to prepare activation of the gas bag restraint system. For this purpose the gas generated is introduced into a positioning means 82, for example, in the form of folded tubing. This tubing is arranged in the vehicle so that it, in its inflated condition, opens a gas bag cover, as a result of which deployment of the gas bag 38 can occur quicker. Furthermore, the tubing 82 may be configured as a tensioning tape which positions the folded gas bag 38, it thereby also permitting speedier deployment of the gas bag 38. Positioning the gas bag 38 is of advantage especially in the case of it being configured as a side gas bag needing to be deployed extremely fast, for example, in the case of a head-side gas bag extending from the A pillar to the C pillar. If a central gas supply system (not shown) is provided in the vehicle the positioning means 82 may also prepare supply of the gas to the gas bag 38 or actuate a corresponding switching device to release the gas. In this case the igniter 72 as well as the ignition delay element 63 would be eliminated, instead of which a gas line would lead directly into the interior of the gas bag 38.

Figure 7:
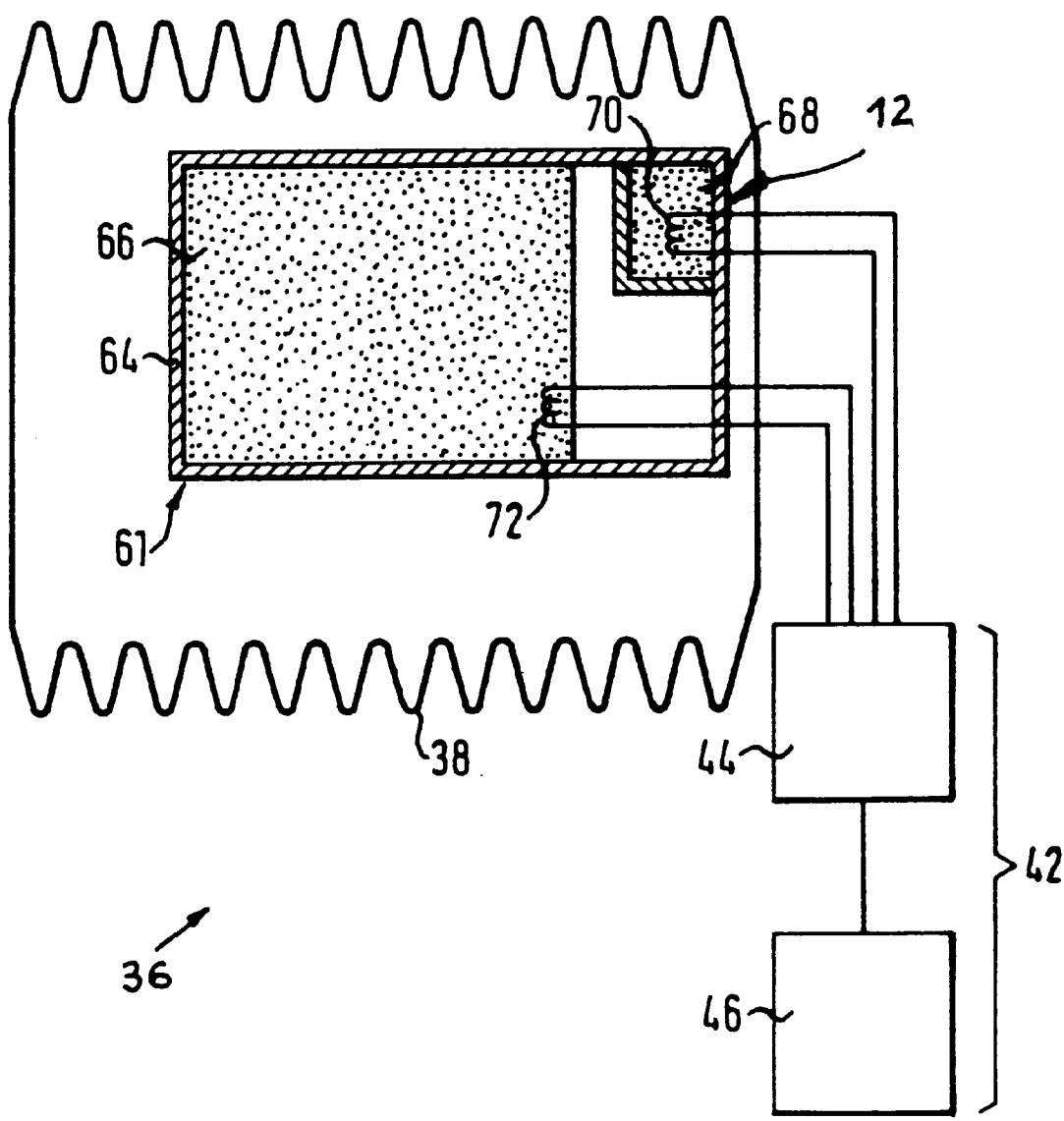
FIG. 7 shows the gas bag restraint system in accordance with the invention in which the source of sound of the device in accordance with the invention is integrated in the gas generator of the gas bag restraint system.

In the case of the embodiment depicted in FIG. 7 the source of sound 12 is even integrated in the gas generator 61 of a gas bag restraint system 36. The interior of a housing 64 accommodates two chambers, the first chamber 66 being filled with pyrotechnic material which on being ignited produces gas for the deployment of a gas bag 38. The second, substantially smaller chamber 68 also filled with pyrotechnic material serves as the source of sound 12. Two separate igniters 70, 72 for the chambers 66, 68 are activated one after the other in time by the control unit 44 so that first the pyrotechnic material in chamber 68 is ignited, gas emerging from the chamber and providing the primary sound event. Subsequently the pyrotechnic material of the first chamber 66 is ignited to cause the gas bag 38 to be deployed by the gas generated thereby.

Figure 8:
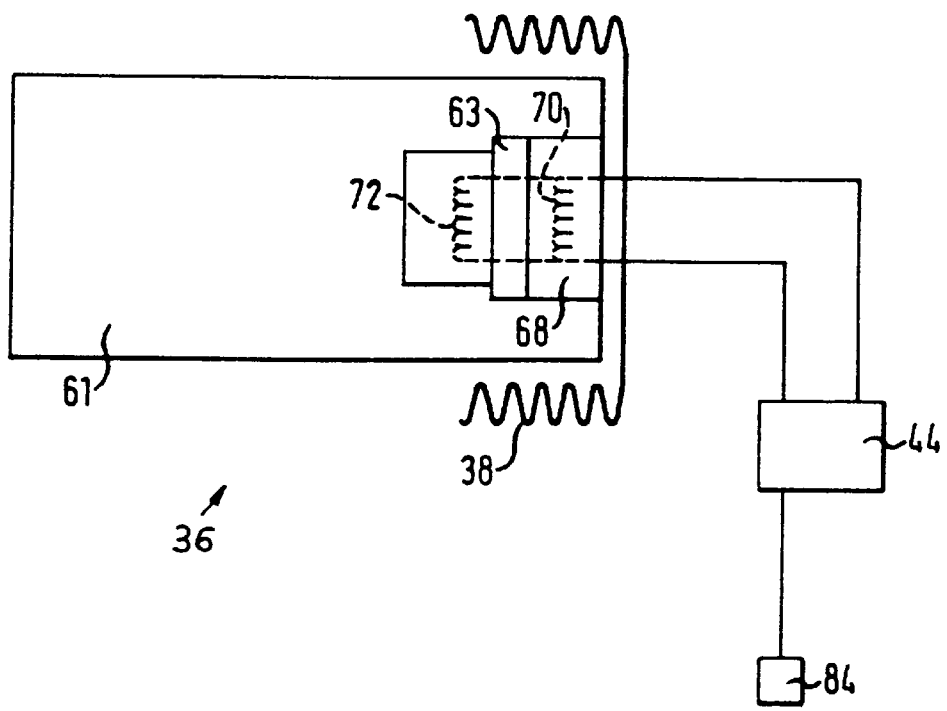
FIG. 8 shows a further embodiment of the gas bag restraint system in accordance with the invention.

The embodiment of a gas bag restraint system 36 shown in FIG. 8 corresponds substantially to that shown in FIG. 7, except that the gas generator 40 is configured as a compressed gas storage or hybrid storage. The pyrotechnic material surrounding the igniter 72 thus serves to open the gas generator housing. However, the igniters 70, 72 are connected to each other via an ignition delay element 63 arranged in the interior of the gas generator so that the control unit 44 does not need to control the two igniters 70, 72 separate from each other. Since the chamber 68 protrudes into the interior of the gas generator housing in which gas is stored under pressure, the heat produced on ignition of the pyrotechnic material accommodated in the chamber 68 is supplied to the gas via a wall defining the chamber 68. The intention behind this arrangement is that the power developed by a compressed gas storage or hybrid storage needs to be constant over the temperature range of from −35° C. to approx. 85° C. Since at extremely low temperatures, more particularly at temperatures below the freezing point, the power of the gas generator is reduced, the gas can be heated up by the ignition of the pyrotechnic material accommodated in the chamber 68. To prevent gas which is already hot from being heated up even further, the control unit 44 may be connected to a temperature sensor which senses the temperature of the gas in the interior of the gas generator 61. If the temperature of the gas is below a predetermined critical temperature, for example, 0° C., the igniter 70 is activated in the restraint action. Should, however, preheating the gas no longer be necessary because the temperature of the gas exceeds the critical temperature, a second source of sound 84 located outside of the gas generator 61 is activated.

The device 10 and the gas bag restraint systems shown in the various Figures are suitable not only for being incorporated in a steering wheel or in the dashboard. Since especially in the case of head gas bag restraint systems and side gas bag restraint systems the gas generators need to deploy the gas bags extremely fast, sound events having a higher frequency and higher sound pressure levels are produced on gas being emitted from the gas generator than is the case with a gas generator accommodated in the steering wheel or in the dashboard.

What is claimed is:

1. A device for preventing damage to hearing which may result from activation of a vehicle occupant restraint system, said device comprising:
   a source of sound (12) for producing a primary sound event having a sound pressure level non-injurious to hearing and for triggering an acoustic reflex of the human ear, and
   an activation control (14, 42) for said source of sound (12),
   said activation control (14, 42) triggering said source of sound (12) to produce said primary sound event and providing a time delay before the occurrence of a secondary sound event having a sound pressure level injurious to hearing occurring on activation of the restraint system, said time delay between the secondary sound event and said primary sound event allowing said acoustic reflex to occur so that damage to hearing as a result of said secondary sound event is prevented.

2. The device according to claim 1 wherein said source of sound (12) produces a primary sound event having a sound pressure level in the range of approximately 70 to approximately 140 dB.

3. The device according to claim 1 wherein said source of sound (12) produces a primary sound event having a sound pressure level of at least approximately 100 dB.

4. The device according to claim 1 wherein said primary sound event commences approximately 0.5 to approximately 30 ms prior to said secondary sound event.

5. The device according to claim 1 wherein said primary sound event commences approximately 5 to approximately 15 ms prior to said secondary sound event.

6. The device according to claim 1 wherein said source of sound (12) produces a sound event having a frequency spectrum in the range of approximately 500 to approximately 8000 Hz.

7. The device according to claim 1 wherein said source of sound (12) produces a sound event having a frequency spectrum in the range of approximately 2000 to approximately 4000 Hz.

8. The device according to claim 1 wherein said source of sound (12) produces a sound event having a frequency of approximately 3500 Hz.

9. The device according to claim 1 wherein said primary sound event does not exceed approximately 2 ms.

10. The device according to claim 1 wherein said source of sound (12) includes an amount of stored energy which, when abruptly released, produces said primary sound event.

11. The device according to claim 10 wherein said amount of stored energy is pyrotechnic material (24) which, when ignited, produces said primary sound event.

12. The device according to claim 10 wherein said amount of stored energy is a compressed gas.

13. The device according to claim 1 wherein said source of sound (12) is a loudspeaker (20, 22).

14. The device according to claim 13 wherein said loudspeaker is a piezoelectric loudspeaker (22).

15. The device according to claim 1 wherein said activation control (14, 42) includes a crash sensor (16, 16a, 16b, 16c, 46, 56), for producing a signal for triggering said primary sound event in response to sensing a vehicle crash.

16. The device according to claim 15 wherein said activation control (14, 42) and said crash sensor (16c) sense an impending vehicle crash.

17. The device according to claim 16 wherein said crash sensor (16c) is a spacing sensor for sensing the distance of an object from the vehicle.

18. The device according to claim 15 wherein said crash sensor (16b) is a tactile sensor which generates a signal in response to sensing a deformation of the vehicle.

19. The device according to claim 15 wherein said crash sensor (16a, 46, 56) is a delay sensor for sensing the vehicle deceleration.

20. The device according to claim 15 wherein said activation control (14, 42) includes a control unit (18, 44, 58) connected to said crash sensor (16, 46, 56), said control unit produces an output signal to said source of sound to produce said primary sound event in response to a signal from said crash sensor (16, 46, 56) indicating the occurrence of a vehicle crash.

21. The device according to claim 15 wherein said device is coupled to said vehicle occupant restraint system, and wherein said crash sensor (46, 56) is shared between said device (10) and said vehicle occupant restraint system.

22. The device according to claim 20 further comprising a control unit (44) connected to said crash sensor (46) for controlling the time delay between said primary sound event and said secondary sound event.

23. A gas bag restraint system for vehicle occupants comprising:
   a gas bag (38),
   a gas generator (40, 61),
   an activation control (42) having a crash sensor (46) and a control unit (44), and
   a device (10) integrated into said gas bag restraint system (36) for preventing damage to hearing having a source of sound (12) for producing a primary sound event having a sound pressure level non-injurious to hearing and for triggering an acoustic reflex of the human ear.

24. The gas bag restraint system according to claim 23 wherein said activation control (42) activates both said gas generator (40, 61) and said primary sound event.

25. The gas bag restraint system according to claim 24 wherein said gas generator (40, 61) includes an igniter (72) and an ignition delay element (63) mounted between said igniter (72) and said source of sound (12), said ignition delay element delays the signal from said activation control to said igniter (72) by a predetermined time delay.

26. The gas bag restraint system according to claim 23 further including a gas bag module, and wherein said source of sound (12) includes an amount of stored energy integrated into said gas bag module which, when abruptly released, produces said primary sound event.

27. The gas bag restrain system according to claim 26 wherein said amount of stored energy is integrated into said gas generator (61).

28. The gas bag restraint system according to claim 23 wherein a first source of sound (68) contains pyrotechnic material which, when ignited, produces said primary sound event and releases heat energy which is directed into said gas generator (61).

29. The gas bag restraint system according to claim 28 wherein said first source of sound (68) is only activated when the temperature of said gas generator (61) is below a predetermined critical temperature, and wherein a second source of sound (84) is provided which is only activated to produce said primary sound event when said critical temperature is exceeded.

30. The gas bag restraint system according to claim 23 wherein said primary sound event is produced by ignition of a pyrotechnic material, said ignition generating an amount of gas which is thereby introduced into a positioning means (82) for preparing a more speedy deployment of the gas bag (38).

31. The gas bag restraint system according to claim 23 wherein said primary sound event is produced by ignition of a gas generator which is a part of a belt tensioning system (48).

32. A method for preventing damage to hearing which may result from activation of a vehicle occupant restraint system, said method including the steps of:

providing a primary sound event having a sound pressure level non-injurious to hearing and sufficient to trigger an acoustic reflex of the human ear, providing a time delay to allow said acoustic reflex to occur, activating said vehicle occupant restraint system which produces a secondary sound event having a sound pressure level injurious to hearing, said time delay between the secondary sound event and said primary sound event allowing said acoustic reflex to occur so that damage to hearing as a result of said secondary sound event is prevented.

33. The method according to claim 32 wherein said primary sound event has a sound pressure level in the range of approximately 70 to approximately 140 dB.

34. The method according to claim 32 wherein said primary sound event has a sound pressure level of at least approximately 100 dB.

35. The method according to claim 32 wherein said primary sound event commences approximately 0.5 to approximately 30 ms prior to said secondary sound event.

36. The method according to claim 32 wherein said primary sound event commences approximately 5 to approximately 15 ms prior to said secondary sound event.

37. The method according to claim 32 wherein said primary sound event has a frequency spectrum of approximately 500 to approximately 8000 Hz.

38. The method according to claim 32 wherein said primary sound event has a frequency spectrum of approximately 2000 to approximately 4000 Hz.

39. The method according to claim 32 wherein said primary sound event has a frequency of approximately 3500 Hz.

40. The method according to claim 32 wherein said primary sound event does not exceed approximately 2 ms.

* * * * *